United States Patent
Fawaz et al.

(10) Patent No.: US 10,566,007 B2
(45) Date of Patent: Feb. 18, 2020

(54) SYSTEM AND METHOD FOR AUTHENTICATING VOICE COMMANDS FOR A VOICE ASSISTANT

(71) Applicant: THE REGENTS OF THE UNIVERSITY OF MICHIGAN, Ann Arbor, MI (US)

(72) Inventors: Kassem Fawaz, Ann Arbor, MI (US); Huan Feng, Ann Arbor, MI (US); Kang Geun Shin, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 54 days.

(21) Appl. No.: 15/698,448

(22) Filed: Sep. 7, 2017

(65) Prior Publication Data

US 2018/0068671 A1    Mar. 8, 2018

Related U.S. Application Data

(60) Provisional application No. 62/384,808, filed on Sep. 8, 2016.

(51) Int. Cl.
| | |
|---|---|
| G10L 21/02 | (2013.01) |
| G10L 25/51 | (2013.01) |
| G10L 25/78 | (2013.01) |
| G10L 15/30 | (2013.01) |
| G10L 17/10 | (2013.01) |
| G10L 15/22 | (2006.01) |
| G10L 21/0272 | (2013.01) |

(52) U.S. Cl.
CPC .......... *G10L 21/0205* (2013.01); *G10L 15/30* (2013.01); *G10L 17/10* (2013.01); *G10L 25/51* (2013.01); *G10L 25/78* (2013.01); *G10L 15/22* (2013.01); *G10L 21/0272* (2013.01)

(58) Field of Classification Search
None
See application file for complete search history.

(56) References Cited

U.S. PATENT DOCUMENTS

| | | | | |
|---|---|---|---|---|
| 6,094,492 | A * | 7/2000 | Boesen | H04M 1/6066 181/130 |
| 7,477,207 | B2 * | 1/2009 | Estep | B63C 11/26 345/8 |
| 8,626,498 | B2 * | 1/2014 | Lee | G10L 25/78 704/210 |
| 8,963,806 | B1 * | 2/2015 | Starner | G02B 27/0093 345/7 |
| 9,135,915 | B1 * | 9/2015 | Johnson | G10L 15/26 |
| 9,196,261 | B2 * | 11/2015 | Burnett | G10K 11/178 |
| 9,773,511 | B2 * | 9/2017 | Sehlstedt | G10L 25/78 |
| 9,924,265 | B2 * | 3/2018 | Lopez Meyer | H04R 1/46 |
| 2011/0026722 | A1 * | 2/2011 | Jing | G10L 21/0208 381/71.1 |

(Continued)

*Primary Examiner* — Neeraj Sharma
(74) *Attorney, Agent, or Firm* — Marshall, Gerstein & Borun LLP; Randall G. Rueth

(57) ABSTRACT

A system and method for authenticating voice commands for a voice assistant includes an accelerometer device for recording vibrations corresponding to speech from a user. The recorded vibrations are compared to speech signals recorded by a microphone to determine if the speech signals originated from the user.

17 Claims, 5 Drawing Sheets

(56) References Cited

U.S. PATENT DOCUMENTS

2014/0337036 A1\* 11/2014 Haiut .................. G10L 15/20
 704/275
2016/0111113 A1\* 4/2016 Cho .................... H04R 1/326
 704/250

\* cited by examiner

SYSTEM AND METHOD FOR AUTHENTICATING VOICE COMMANDS FOR A VOICE ASSISTANT

CROSS-REFERENCE TO RELATED APPLICATION

The present application claims the benefit of U.S. Provisional Patent Application No. 62/384,808, which is entitled "System and Method for Authenticating Voice Commands for a Voice Assistant," which was filed on Sep. 8, 2016, and which is hereby expressly incorporated by reference herein in its entirety.

STATEMENT OF GOVERNMENT SUPPORT

This invention was made with government support under grant number CNS-1505785 awarded by the US National Science Foundation. The government has certain rights in this invention.

FIELD OF THE DISCLOSURE

The present disclosure generally relates to continuously authenticating voice commands and, more particularly, to a specialized device configured to record body-surface vibrations associated with speech to be used in authenticating voice commands.

BACKGROUND

Many new devices include voice assistant software with the capability to receive and execute voice commands. The ongoing trend of enabling voice commands has largely contributed to the ongoing trend of wearable devices, smart vehicles, and home automation systems. Voice assistants, like those provided by various smartphones, are well known and have become a part of our everyday lives. The features provided by voice assistants are useful, especially in scenarios where touch interfaces are inconvenient or even dangerous to use (e.g., while driving). Nevertheless, the open nature of the voice channel makes voice assistants difficult to secure and thus are exposed to various attacks.

Voice as an input mechanism is inherently insecure as it is prone to replay, sensitive to noise, and easy to impersonate. Existing voice authentication mechanisms fail to provide comprehensive security features for voice assistant systems. Further, even established security features, like voice-as-biometric, contain flaws. The lack of robust security for voice-assistant systems has somewhat stifled the growth of such systems, especially because the security flaws can lead to severe attacks including information theft, financial harm and unauthorized access to smart appliances and vehicles.

SUMMARY

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a system for authenticating voice commands for a voice assistant comprising: (1) one or more processors, (2) a microphone communicatively coupled to the one or more processors, wherein the microphone is configured to record speech signals, and (3) an accelerometer device corresponding to a user and communicatively coupled to the one or more processors, wherein the accelerometer is configured to record vibrations corresponding to speech from the user, is provided. The one or more processors may be configured to receive the recorded speech signals from the microphone and recorded vibrations from the accelerometer device. The one or more processors may further be configured to compare the recorded speech signals to the recorded vibrations to determine if the speech signals originated from the user.

In another embodiment, a computer-implemented method for authenticating voice commands for a voice assistant is provided. The method includes receiving, via an accelerometer device, recorded vibration data, wherein the recorded vibration data corresponds to speech from a user corresponding to the accelerometer device. The method further includes receiving, via a microphone, recorded speech signals, wherein the speech signals are recorded substantially at the same time as the vibration data. The method further includes comparing, via one or more processors, the speech signals to the vibration data to determine if the speech signals originated from the user.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein.

Figure 1:
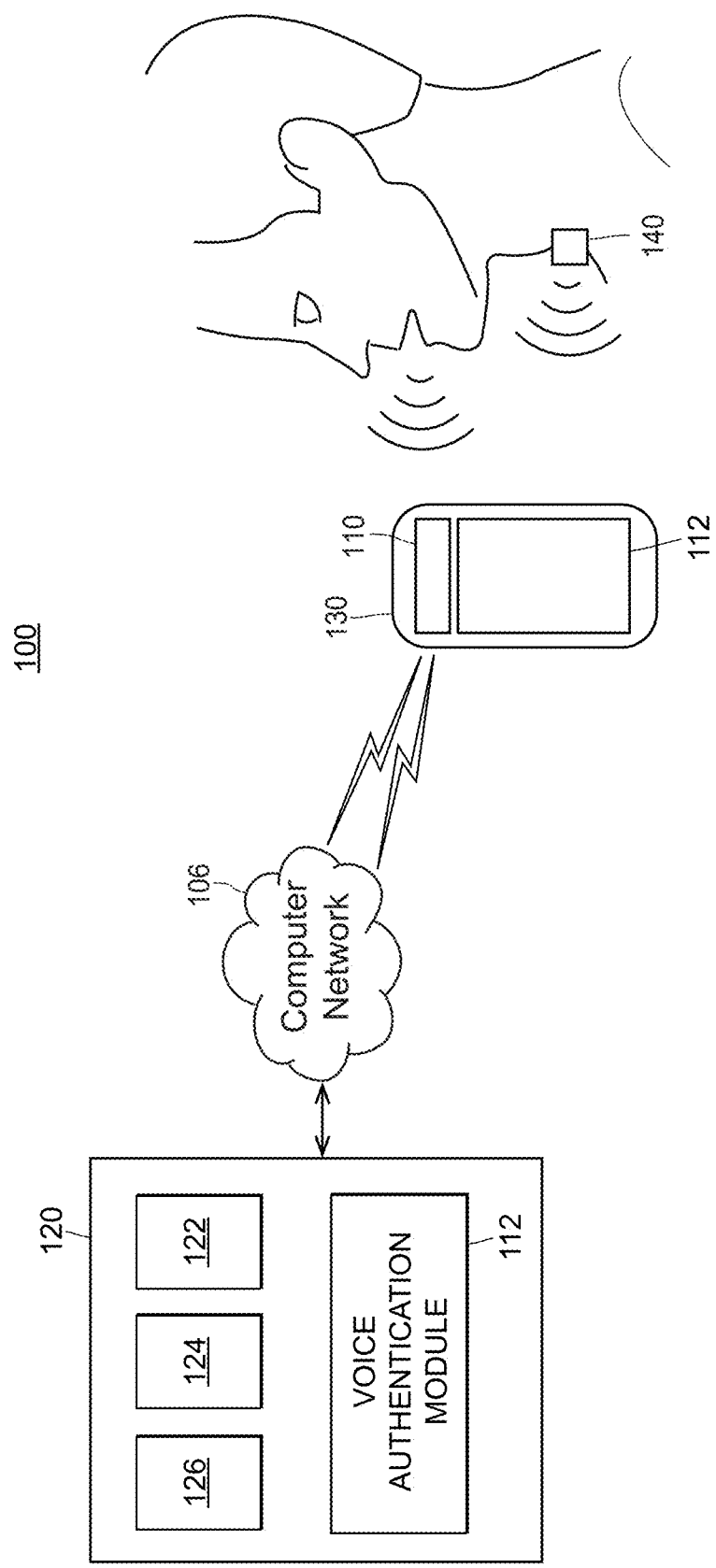
FIG. 1 is a simplified and exemplary block diagram of a system for authenticating voice commands for a voice assistant.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The invention of the present disclosure provides a system and method for continuous authentication for voice assistants. The system collects various data associated with a voice command, such as a speech signal and vibrations of the head, neck and/or chest of a user corresponding to the speech signals. The data is collected from at least one accelerometer and one microphone disposed in one or more devices. For example, the accelerometer may be disposed in a necklace worn by a user and communicatively coupled to a smartphone, including a microphone, that implements a voice assistant. As the user speaks, the wearable device utilizes an accelerometer to record and then transmit the vibration data to the smart phone which is simultaneously recording the speech signals. A module of the system, known as a voice authentication module, may then analyze the recorded vibration and speech signal data and either authenticate or deny the voice command. If the voice command is authenticated, the voice assistant may accept the command and execute it accordingly.

Current security approaches for voice assistant systems are flawed. Some systems are non-continuous (e.g., a user provides a fingerprint or password to access the system), which allows adversaries to access the system once the initial security measure is bypassed. Even continuous systems, such as biometric voice recognition, can easily be bypassed. An adversary can easily bypass voice-as-biometric authentication mechanisms by impersonating the user's voice or simply by replaying a recording of an authorized voice. It is also possible to inject voice commands through techniques (mangled voice, wireless signals, or radio stations) that do not alert a user of a potential attack.

Instead, the current invention utilizes additional wearable hardware to record and transmit body vibrations to provide ongoing speech authentication. The current system applies a multi-stage matching algorithm to compare the vibrations recorded from the accelerometer with that of the speech signals recorded from the microphone. Further, when performing the matching algorithm, the current system does not lose any information from the collected signals. The current system also identifies and matches individual speech segments from each signal to prevent an adversary from injecting any stealthy command.

I. Accelerometer Device

In an embodiment, the method of the present disclosure is enabled by specialized hardware configured to record and transmit vibrations from the human body related to speech. The hardware can be implemented as a device including an accelerometer and other components (memory, one or more processors, an antenna, etc.) to record and transmit vibrations. The device can further be installed as part of a larger article to be worn by a human being. For example, the device may be inserted on a necklace such that the device rests on the throat or sternum of a user. In another embodiment, the device may be installed on a headset such that the device is in contact with the mouth, jaw and/or head of the user. In certain embodiments, the device may remain in contact with the user's body throughout the duration of the voice authentication process in order to enable continuous authentication.

The device may also be capable of transmitting recorded vibrations through wireless signals. In one embodiment, the device may transmit recorded data through a Bluetooth™ connection to a device operating a voice assistant. Depending on the needs of the system, the device may be configured to transmit recorded data through one or more channels. The device may use any suitable communication protocol to transmit recorded vibrations.

In some embodiments, the device may be configured such that it is only operable by a particular user. In this embodiment, the device may be reconfigured to work with another particular user. In other embodiments, the device may be shared among users and will authenticate voice commands for any user wearing the device. Further, in some embodiments a device may be configured to authenticate both male and female voices, while in other embodiments the device may be configured to work specifically for either a male or female voice.

Further, the device may include one or more components to process recorded vibrations prior to transmitting the recordings. For example, the device may insert metadata such as timestamps to help the voice authentication module (discussed below) sync the recorded vibrations with recorded speech signals for comparison. Further, the device may edit the recorded vibrations to apply a filter, remove noise, adjust frequency, and/or otherwise prepare the recorded vibrations in a format compatible with other components of the system.

In an embodiment, the device may provide continuous authentication as long as it in contact with a user and in communication with a device operating a voice assistant. During each instance of speech from the user, the device may record and transmit the vibrations corresponding to the speech. In an embodiment, the device may be configured such that it does not record vibrations resultant from sound waves in the air. In other words, the device may only record vibrations from the user in direct contact with the device. Further embodiments of the accelerometer device are discussed with respect to reference numeral 140 of FIG. 1, below.

II. Exemplary System

FIG. 1 generally illustrates one embodiment for a system 100 for providing continuous voice authentication. The system 100 may include hardware and software applications, as well as various data communication channels for facilitating data communications between the various hardware and software components. The system 100 may include devices 130 and/or 140 as front-end components and back-end components in communication with each other via a communication link 106 (e.g., computer network, internet connection, etc.).

FIG. 1 illustrates a block diagram of a high-level architecture of a voice authentication system 100 including various software and/or computer-executable instructions and/or hardware components and/or modules that may employ the software and/or instructions to authenticate voice commands. The various modules may be implemented as computer-readable storage memories containing computer-readable instructions (i.e., software) for execution by a processor of the computer system 100. The modules may perform the various tasks associated with authenticating voice commands, as herein described. The computer system 100 may also include both hardware and software applications, as well as various data communications channels for communicating data between the various hardware and software components.

The accelerometer device 140 has been discussed above in detail. In certain embodiments, the accelerometer may be communicatively coupled to the client device 130. In other embodiments, the accelerometer device 140 may be configured to transmit recorded vibrations directly to the server 120 via the computer network 106.

The client device 130 may include, by way of example, a mobile device (such as a tablet computer, a cell phone, a personal digital assistant (PDA), a smart-phone, a laptop computer, a wearable computing device, smart watches, smart bracelets, phablets, etc.), a desktop computer, an interface device for a smart phone, an onboard computer for a vehicle, other smart devices and appliances, devices configured for wired and/or wireless RF (Radio Frequency) communication, etc. Of course, any client or mobile device appropriately configured (i.e., capable of operating a voice assistant) may interact with the voice authentication system 100.

The client device 130 may include a microphone 110 to record speech signals. However, in other embodiments, the microphone 110 may be separate from the client device 130. In these embodiments, the microphone 110 may be configured to transmit recorded speech signals to the client device 130. For example, a headset may be configured to include an accelerometer device 140 and a microphone 110. The head set would then transmit recorded vibrations and recorded speech signals to the client device and/or the server 120 to further authenticate voice commands corresponding to the recorded data.

The digital network 106 may be a proprietary network, a secure public Internet, a virtual private network and/or some other type of network, such as dedicated access lines, plain ordinary telephone lines, satellite links, combinations of these, etc. Where the digital network 106 comprises the Internet, data communication may take place over the digital network 106 via an Internet communication protocol.

A system server 120 may send and/or receive information and/or data for the system 100, such as computer-executable instructions and/or data associated with voice assistant applications executing on the client 130. The applications executing within the system 100 may include cloud-based applications, web-based interfaces to the data system 116, software applications executing on the clients, and/or applications including instructions that are executed and/or stored within any component of the system 100. The applications and module 112 may be stored in various locations including separate repositories and/or physical locations.

In some embodiments, the server 120 may include computer-executable instructions 122 stored within a memory 124 of the server 120 and/or executed using a processor 126. The instructions 122 may instantiate a voice authentication module 112 and/or send instructions to the client 130. In some embodiments, the voice authentication module 112 may be implemented at least partially on the server 120 and/or client 130. Depending on the needs of the system, the voice authentication module may be executed on the client 130, on the server 120, or any combination thereof. In one aspect, the module 112 may be a client application that may be implemented as a series of machine-readable instructions for performing the various tasks associated with implementing the voice authentication system 100, as well as receiving information and/or transmitting information between device 130 and/or server 120.

The voice authentication (VA) module 112 may be configured to process, filter, analyze, and/or compare recorded speech signals from the microphone 110 and recorded vibration data from the accelerometer device 140. For example, the VA module 112 may synchronize the recorded speech signals with the recorded vibrations. The VA module 112 may perform the synchronization by aligning time shifts of the speech signal and vibration data such that there is maximum cross correlation between both signals. This operation may be vital for any comparisons, as the speech signals and the vibration data may not be received and/or recorded at the same time.

Further, the VA module 112 may be configured to run various algorithms to determine if the speech signals originated from the user corresponding to the vibration data. In one embodiment, the VA module 112 may compare the speech signals to the vibration data to determine if they are correlated. Depending on the criteria of the system, the correlation may need to be within a certain percentage to authenticate the voice command. In other words, if the VA module 112 determines that the speech signals have a high enough correlation to the vibration data, then the speech signals can be attributed to the user and, thus, a voice command corresponding to the speech signals is considered authenticated. The VA module 112 may then pass the authenticated voice commend to a voice assistant for further processing. An example algorithm for comparing the speech signals and vibration data is discussed in detail below.

III. Exemplary Method

Figure 2:
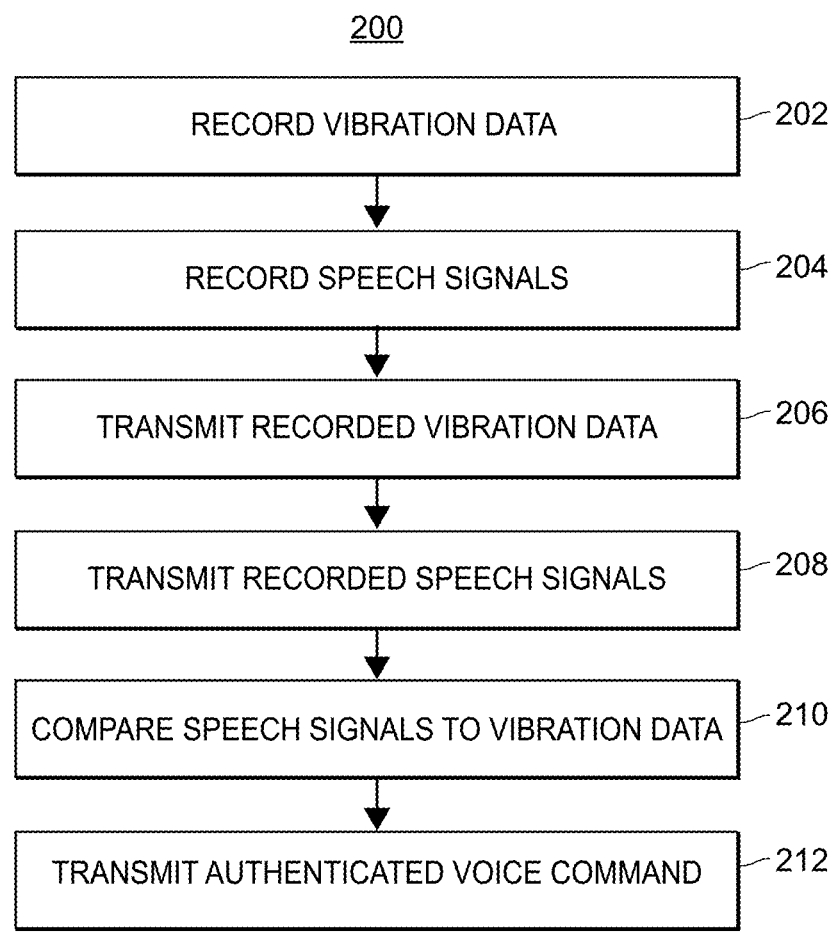
FIG. 2 is a flow diagram illustrating an exemplary method for authenticating voice commands for a voice assistant.

With reference to FIG. 2, the system 100 described herein may be employed in a method 200 to authenticate voice commands for a voice assistant. The method 200 may include one or more functions and/or routines in the form of non-transitory computer-executable instructions that are stored in a tangible computer-readable storage medium and/or executed using a processor of a computing device (e.g., the client device 130 and/or the server 120). The routines may be included as part of any of the modules described in relation to FIG. 1 above and/or as part of a module that is external to the system illustrated by FIG. 1.

The method 200 may begin after the system records vibration data via an accelerometer device (Block 202). As discussed above, vibration data corresponds to recorded vibrations related to speech from a user associated with the accelerometer device. In an embodiment, a user may be associated with the accelerometer device if the user is wearing the device as a necklace, headset, or other suitable equipment.

At approximately the same time, the system may also record speech signals via a microphone (Block 204). As discussed above, the microphone may be disposed as part of a client device with voice assistant capability. If speech signals and vibration data are recorded at disparate points of time, then clearly the speech signals are disassociated from the vibration data and authentication automatically fails. Thus, the method 200 only continues with speech signals and vibration data which are recorded at substantially the same time.

The system may then transmit the recorded vibration data (Block 206). In one embodiment, the device housing the accelerometer may implement Bluetooth™ technology to transmit the recorded vibration data. Similarly, the system may also transmit the recorded speech signals (Block 208). The vibration data and speech signals may be transmitted along with metadata indicated other information such as time-stamps, frequencies, and any other information to facilitate authentication. The vibration data and speech signals may be transmitted to a client device and/or to a back end server to be authenticated. As discussed above, depending on the embodiment, authentication can be performed entirely on the client, entirely on the server, or any suitable combination of server/client processing.

The system may then compare the recorded speech signals to the recorded vibration data (Block 210). As discussed below, the comparison of the speech signals to the vibration data may include many steps including processing, filtering, synchronization and analysis. In some embodiments, the speech signals and vibration data may be normalized to remove error related to background noise and to remove spikes in the signals/data. In some embodiments, the speech signals and vibration data may be filtered to remove aliasing.

Comparison of the speech signals to the vibration data may also include performing a correlation analysis to determine the correlation between the two. Acceptable correlation levels between the vibration data and speech signals may depend on a number of factors such as the quality of the recordings, the necessary level of security, usability/wearability, etc. If the speech signals and vibration data are sufficiently correlated, then the speech signal was originated from the user corresponding to the vibration data. Thus, the voice command corresponding to the speech signal is authenticated.

If the system has authenticated the voice command, the system may then transmit the voice command to a voice assistant (Block 212). If the speech signals and vibration data are not sufficiently correlated, then the voice command is not authenticated. The system may restart the method each time vibration data is recorded, thus enabling continuous voice authentication and added security for voice assistant devices.

IV. Example Algorithm

In an example embodiment, the VA module 112 may implement a matching algorithm to authenticate voice commands. The matching algorithm may include receiving speech signals and vibration data along with the corresponding sampling frequencies. The matching algorithm may conclude by producing a decision value indicating whether there is a match between the speech signals and the vibration data (i.e. authenticate or deny). The matching algorithm may further output a "cleaned" speech signal when the speech signal is authenticated. The "cleaned" speech signal may contain only those speech segments that resulted from body vibrations, i.e., could have only been generated by the speaker. The matching algorithm may include three stages: pre-processing, per-segment analysis, and post-processing.

Figure 3:
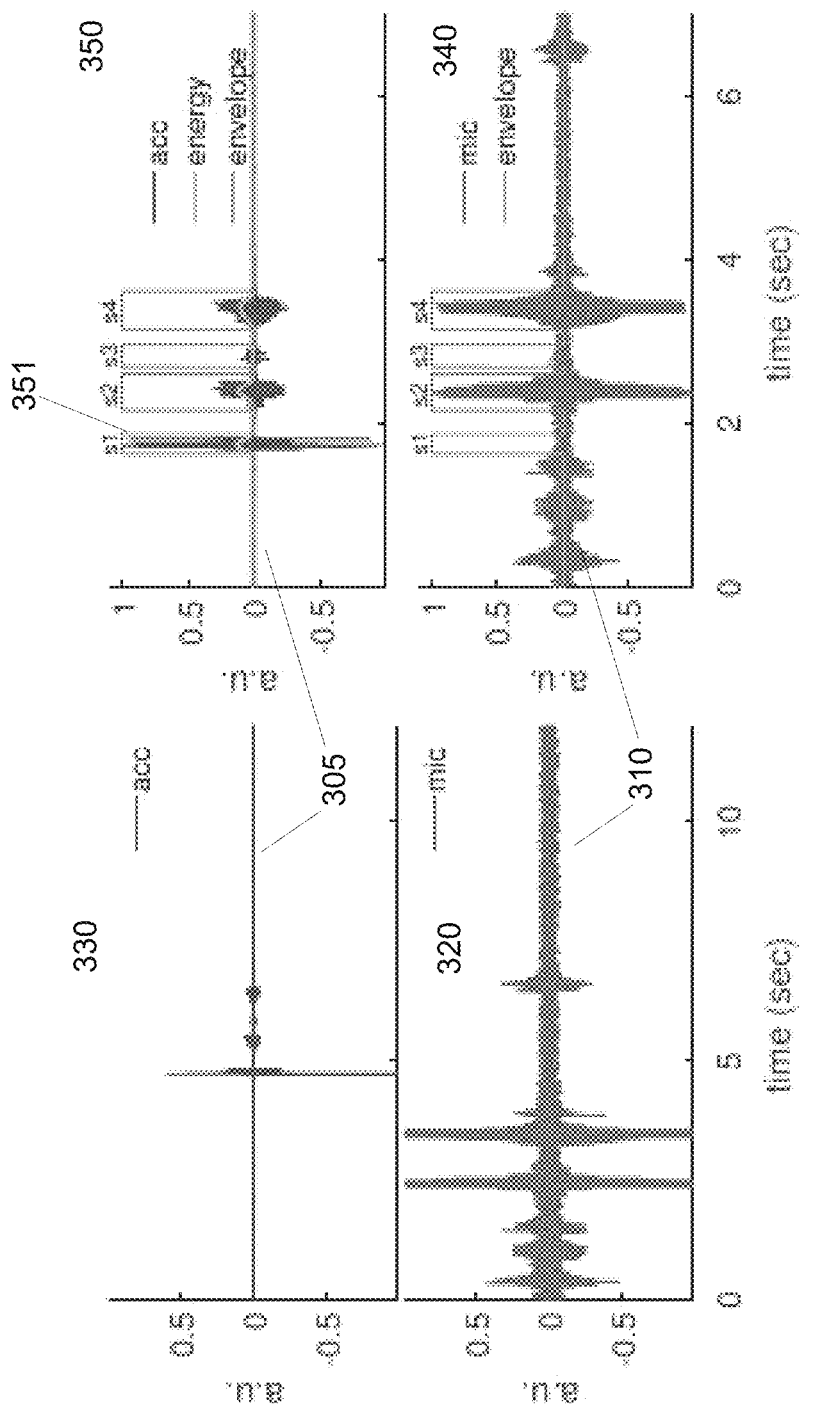
FIG. 3 is an example illustration of graphs of the received vibration data and speech signals.

The following description of the example matching algorithm will be illustrated with a running example of a male speaker recording the two words "cup" and "luck" with a short pause between them. Referring to FIG. 3, the example vibration data 305 may be, for example, recorded from an accelerometer device in contact with a user's sternum at 64 kHz. Further, the speech signal data 310 may be recorded from a built-in laptop microphone at 44.1 kHz, 50 cm away from the user.

Beginning with the pre-processing step, in an example embodiment, the module 112 may re-sample both vibration data and speech signals to the same sampling rate while applying a low-pass filter to prevent aliasing. In some embodiments, the low-pass filter may be 4 Khz, 8 kHz or any other suitable frequency that preserves most of the acoustic features of the speech signals and while reducing the processing load. FIG. 3 illustrates raw speech signals 320 and vibration data 330. With regard to the raw vibration data 330, the graph illustrates a high-energy spike due to an abrupt movement of the accelerometer, and low energy components resulting from speech vibrations. In contrast, the raw speech signals 320 demonstrate two high-energy segments along with other lower-energy segments corresponding to background noise.

Next, the example algorithm may refine the raw data 320 and 330 by normalizing the magnitude of the data to have a maximum magnitude of unity, which necessitates removal of the spikes in the data. The normalization step may facilitate recovery of lower energy components corresponding to the actual speech. In one embodiment, the VA module 112 may perform the normalization by computing a running average of the data energy and enforcing a cut-off threshold, keeping only the data that lies within a certain number of standard deviations from the running average. Graphs 340 and 350 of FIG. 3 illustrate normalized speech signals and vibration data, respectively. Further, the graphs 340 and 350 have been aligned by finding the time shift that results in the maximum cross correlation of both graphs. In some embodiments, the graphs 340 and 350 may also be truncated so that the two graphs are on the same signal duration.

Next, the example matching algorithm may continue pre-processing by identifying the energy envelope of the vibration data and respective application to the speech signal. The VA module 112 identifies the portions of data where the signal has a significant signal-to-noise ratio (SNR) "bump." These "bumps" are evident in the peaks in graphs 340 and 350. The energy envelope of the signal is a quantification of the signal's energy between 0 and 1. In particular, the portions of the signal with average energy exceeding 5% of maximum signal energy may map to 1, while other segments map to 0. This may produce the four energy segments of the vibration data in graph 350.

Pre-processing of the matching algorithm concludes when the VA module 112 overlays the vibration data envelope to the speech signal so that it removes all portions of the speech signal that did not result from vibrations of the user. By removing all speech signals not corresponding to vibrations from the user, you are taking the first step of providing security in the voice communication channel. This may result in removing most or all cases of attacks on voice assistant systems when the user is not actively speaking. Further, this step may improve the accuracy of the voice recognition by removing background noise and sounds from the speech signals that could not have been generated by the user.

Figure 4:
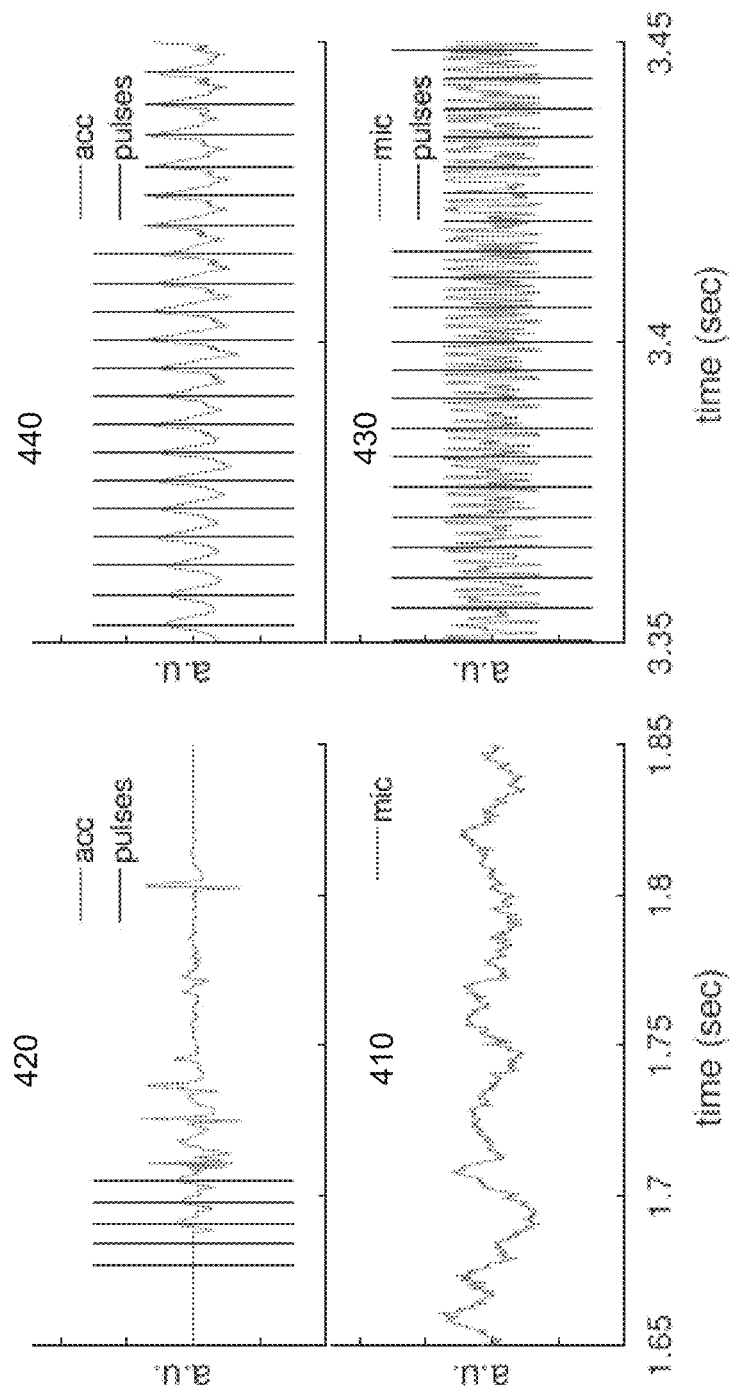
FIG. 4 is an example illustration of graphs of the received vibration data and speech signals after filtering.

Next the matching algorithm may continue to the per-segment analysis by first performing segment-by-segment matching. For example, referring to FIG. 3, there are four segments of graphs 340 and 350 corresponding to portions of the signal where the envelop is continuously equal to 1. For each segment, the system may normalize the signal magnitude to unity in order to remove the effect of other segments, such as the effect of segment 351 in graph 350. The system may apply the Boresma approach, for example, to extract the glottal (speech) cycles from each segment. This example approach relies on the identification of periodic patterns in the signal as the local maxima of the auto-correlation function of the signal. Thus, each segment is associated with a series of glottal pulses as shown in FIG. 4.

The system uses information about the segment and the corresponding glottal pulses to filter out the segments that do not correspond to human speech and those that do not match between the accelerometer (vibration data) and microphone (speech signals) signals as follows: (1) If the length of the segment is less than 20 ms, the length of a single phonetic, then the system removes the segment from both accelerometer and microphone signals. Such segments might arise from abrupt noise. (2) If the segment has no identifiable glottal pulses, or the length of the longest continuous sequence of glottal pulses is less than 20 ms, then the system also removes the segment. Graphs 410 and 420 show the segment corresponding to segment 351 at a higher resolution. Only five pulses were identified which could not have resulted from a speech. (3) If the average glottal pulses intervals of the accelerometer segment is larger than 0.003 seconds or smaller than 0.0125 seconds, then the system removes the segment from both signals. This refers to the case of the fundamental frequency (inverse of the average glottal cycle length) falling outside the range of [80 Hz, 333 Hz] which corresponds to the human speech range. (4) If the average relative distance between glottal pulse sequence between the accelerometer and microphone segments is higher than 25%, then the system removes the segment from both signals. This refers to the case of interfered speech; the instantaneous pitch variations should be similar between the accelerometer and microphone in the absence of external interference. For example, it is obvious that the pitch information is very different between the vibration data 420 and speech signal 410.

After the filtering discusses above is complete, the system may perform a final verification by running a normalized cross correlation between the accelerometer and microphone segments. If the maximum correlation coefficient falls inside the range [−0.25, 0.25], then the segments are discarded. The correlation is a costlier operation but is known metric for signal similarity that takes into consideration all the information of the time-domain signals. For example, the graphs 430 and 440 demonstrate show matching pitch information and a maximum cross correlation coefficient of 0.52.

Figure 5:
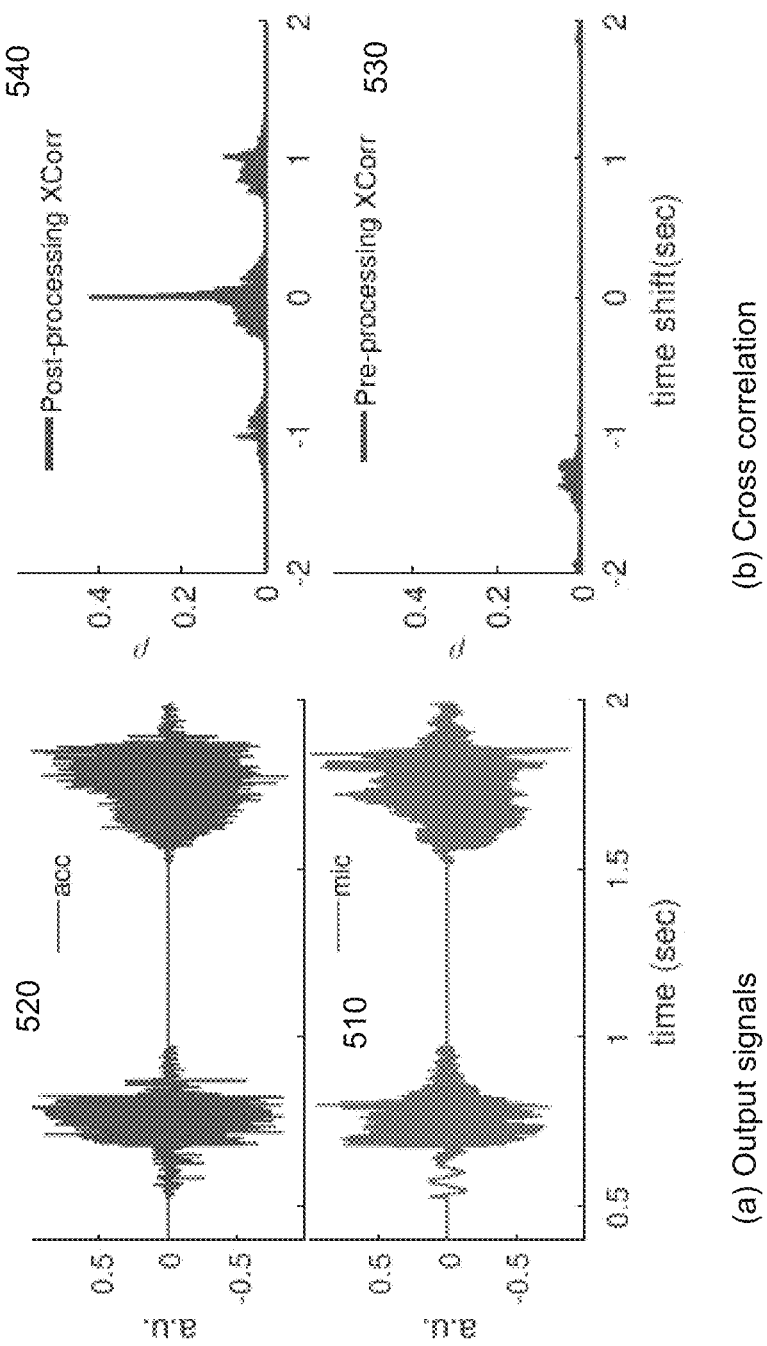
FIG. 5 is an example illustration of graphs of the received vibration data and speech signals after normalization and cross correlation.

The matching algorithm may then continue to post-processing once the per-segment analysis is complete. Only the "surviving" segments are included in the final accelerometer and microphone signals. FIG. 5 illustrates the segments corresponding to matching speech components. Referring to the graph 510, it is evident that the microphone signal has two significant components referring to each word ("cup" and "luck"), and all background noise has been removed.

The final post-processing step may include measuring the signal similarity between the accelerometer and microphone signals by using the normalized cross correlation. The system analyzes whether the normalized cross correlation has a significant peak and that the maximum value is outside the range [−0.4, 0.4]. This indicates that the two signals are included within each other as shown in the plot 540 of FIG. 5. In this case, the system will conclude that the resulting microphone signal matches the recorded vibration data. In other words, the voice command is authenticated. The system then passes the final (filtered and normalized) speech signals to the voice assistant system to perform the speech recognition and other functionalities.

In an embodiment, the system may not be able to perform the cross correlation until the vibration data and speech signals have been filtered. This is important because, for instance, the cross correlation value might be high even when some segments do not entirely match. In such cases, the adversary could inject some crafted sounds that do not affect the overall energy of the signal and thus penetrate the security system. Another reason filtering may be important is that before filtering the signal, the cross correlation results do not have any real indication of the signal similarity. Referring to plot 530, which corresponds to the cross correlation performed on the original input signals of FIGS. 3 (320 and 330). As evident from plot 530, the cross correlation shows absolutely no similarity between the two signals, even though they describe the same speech sample by the same speaker.

The above matching algorithm is intended to illustrate an example method for comparing the received vibration data and speech signals. The example method is not intended to be limiting. Any suitable algorithm may be deployed to authenticate voice commands. For example, as technology improves and components of the system can process more data, the algorithm may be further refined to further improve accuracy of the authentication of voice commands by, for example, employing machine learning methods to dynamically learn the cut-off thresholds

V. Security Features

The system and methods of the current disclosure overcomes the three main types of security threats to typical open air voice channel systems. This security is enabled by the accelerometer device in conjunction with a matching algorithm, as discussed in greater detail above. The system may provide protection both when the user is speaking and silent. For example, if a user is not speaking, and thus no vibration data is available, the system may ignore all received speech signals. This removes the threat of stealthy attacks such as mangled voice attack and further from biometric override attacks such as impersonation, wireless-based replay, etc.

The system is also protected from an adversary attempting to trigger false vibration data. In this case, an adversary may attempt to trigger vibrations through sound waves in the air. However, this is extremely unlikely to be successful as the sound waves would need to be both very loud and deployed within a very short distance (approximately 30 cm) from the accelerometer device to produce vibration data readings. Such an attack would be highly improbable, and even if attempted would be obvious to the user wearing the accelerometer device.

Even if an adversary attempts to launch an attack while a user is speaking, the system will successfully thwart the attack. This is because the system and method of the present disclosure is configured to distinguish between the vibration data of the voice spoken by the bearer of the accelerometer device and a reconstructed sound of the same command, even when the reconstructed voice is indistinguishable from the original to the human ear.

Further, even when the user is speaking, the system is safe from biometric attacks because the system can successfully distinguish commands and phonetics of the same user. Further, the system can differentiate the same phonetic sound and/or command across different users. Further still, even in if the user is speaking while an adversary is replaying another sound clip of the user, the system can still differentiate between the speech signals and vibration data to only authenticate the signals spoken by the actual user. Thus, whether the user is speaking or silent, the current system is impervious to previously known threats.

VI. Additional Considerations

The following additional considerations apply to the foregoing discussion. Throughout this specification, plural instances may implement functions, components, operations, or structures described as a single instance. Although individual functions and instructions of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

For example, the network 106, may include, but is not limited to, any combination of a LAN, a MAN, a WAN, a mobile, a wired or wireless network, a private network, or a virtual private network. Moreover, it is understood that any number of client computers or display devices are supported and may be in communication with the data system 120.

Additionally, certain embodiments are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain functions. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, which may be one of an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules may provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and may operate on a resource (e.g., a collection of information).

The various operations of exemplary functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some exemplary embodiments, comprise processor-implemented modules.

Similarly, the methods or functions described herein may be at least partially processor-implemented. For example, at least some of the functions of a method may be performed by one or more processors or processor-implemented hardware modules. The performance of certain of the functions may be distributed among the one or more processors, not only residing within a single machine, but deployed across a number of machines. In some exemplary embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors). These operations are accessible via a network (e.g., the Internet) and via one or more appropriate interfaces (e.g., application program interfaces (APIs)).

The performance of certain operations may be distributed among the one or more processors, not only residing within a single machine, but deployed across a number of machines. In some exemplary embodiments, the one or more processors or processor-implemented modules may be located in a single geographic location (e.g., within a home environment, an office environment, or a server farm). In other exemplary embodiments, the one or more processors or processor-implemented modules may be distributed across a number of geographic locations.

Some portions of this specification are presented in terms of algorithms or symbolic representations of operations on data and data structures stored as bits or binary digital signals within a machine memory (e.g., a computer memory). These algorithms or symbolic representations are examples of techniques used by those of ordinary skill in the data processing arts to convey the substance of their work to others skilled in the art. As used herein, a "function" or an "algorithm" or a "routine" is a self-consistent sequence of operations or similar processing leading to a desired result. In this context, functions, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a function, process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a computer system 100 for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a method for authenticating voice commands through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed:

1. A system for authenticating voice commands for a voice assistant comprising:
   one or more processors,
   a microphone communicatively coupled to the one or more processors, wherein the microphone is configured to record speech signals, and
   an accelerometer device corresponding to a user and communicatively coupled to the one or more processors, wherein the accelerometer is configured to record vibrations corresponding to speech from the user; wherein
   the one or more processors are configured to:
      receive the recorded speech signals from the microphone and recorded vibrations from the accelerometer device;
      compare the recorded speech signals to the recorded vibrations to determine if the speech signals originated from the user, the comparing of the speech signals to the vibration data comprising implementing a matching algorithm with steps including pre-processing, per-segment analysis, and post-processing, wherein the pre-processing includes
         (i) synchronizing the recorded speech signals to the recorded vibration data, the synchronizing comprising aligning a time shift of the recorded speech signals and the recorded vibration data that produces maximum cross correlation between the speech signals and the vibration data,
         (ii) identifying, from the synchronized speech signals and vibration data, one or more segments of the recorded vibration data in which an average energy exceeds a predefined threshold, and
         (iii) identifying, based upon the synchronization of the recorded speech signals and the recorded vibration data, one or more segments of the recorded speech signals that correspond to the one or more segments of the recorded vibration data, to thereby produce one or more data segments each corresponding to a synchronized segment of speech signals and segment of vibration data; and
      selectively provide at least a portion of the speech signals to the voice assistant in response to determining that the at least the portion of the speech signals originated from the user.

2. The system of claim 1, wherein the accelerometer device is disposed as a wearable article.

3. The system of claim 1, wherein the wearable article is configured to be in physical contact with one or more of a throat, a sternum, a jaw, or a head of the user.

4. The system of claim 1, wherein the one or more processors are disposed in a client device including a smartphone, a laptop, a personal computer, a smart watch, a tablet, a portable audio device, a smart home, or an onboard computer of a vehicle.

5. The system of claim 4, wherein the microphone is disposed in the client device.

6. The system of claim 1, wherein the one or more processors are disposed in a server system.

7. The system of claim 1, wherein the one or more processors are further configured to:

clean the speech signals by removing one or more segments of the speech signals that have been determined to not have originated from the user,
wherein selectively providing the at least the portion of the speech signals includes providing the cleaned speech signals to the voice assistant.

8. The system of claim 1, wherein the accelerometer device and the microphone are disposed in a headset.

9. The system of claim 1, wherein the per-segment analysis includes determining whether each of the one or more data segments corresponds to human speech, based at least upon, for each of the one or more data segments:
determining whether a length of the data segment is at least a predetermined length corresponding to human speech;
determining whether the data segment indicates a glottal pulse sequence of at least the predetermined length;
determining whether a frequency of the glottal pulse sequence is within a predetermined range of frequencies corresponding to a human speech range; and
determining whether an average difference in pitch variations between the corresponding segment of speech signals and the corresponding segment of vibration data exceeds a predetermined value.

10. A computer-implemented method for authenticating voice commands for a voice assistant comprising:
receiving, via an accelerometer device, recorded vibration data, wherein the recorded vibration data corresponds to speech from a user corresponding to the accelerometer device;
receiving, via a microphone, recorded speech signals, wherein the speech signals are recorded substantially at the same time as the vibration data;
comparing, via one or more processors, the speech signals to the vibration data to determine if the speech signals originated from the user, the comparing of the speech signals to the vibration data comprising implementing a matching algorithm with steps including pre-processing, per-segment analysis, and post-processing, wherein the pre-processing includes
(i) synchronizing the recorded speech signals to the recorded vibration data, the synchronizing comprising aligning a time shift of the recorded speech signals and the recorded vibration data that produces maximum cross correlation between the speech signals and the vibration data,
(ii) identifying, from the synchronized speech signals and vibration data, one or more segments of the recorded vibration data in which an average energy exceeds a predefined threshold, and
(iii) identifying, based upon the synchronization of the recorded speech signals and the recorded vibration data, one or more segments of the recorded speech signals that correspond to the one or more segments of the recorded vibration data, to thereby produce one or more data segments each corresponding to a synchronized segment of speech signals and segment of vibration data; and
selectively providing, via the one or more processors, at least a portion of the speech signals to the voice assistant in response to determining that the at least the portion of the speech signals originated from the user.

11. The method of claim 10, wherein the post-processing includes cleaning the speech signals by removing one or more segments of the speech signals that have been determined to not have originated from the user, and wherein selectively providing the at least the portion of the speech signals comprises providing the cleaned speech signals to the voice assistant.

12. The method of claim 10, wherein the accelerometer device is disposed as a wearable article.

13. The method of claim 12, wherein the wearable article is configured to be in physical contact with one or more of a throat, a sternum, a jaw, or a head of the user.

14. The method of claim 10,
wherein selectively providing the at least the portion of the speech signals comprises preventing the transmission of a second portion of the speech signals to a voice assistant in response to determining that the second portion of the speech signals did not originate from the user.

15. The method of claim 10, wherein the speech signals and vibration data are compared prior to being transmitted to a voice assistant, wherein only the speech signals that have been determined to have originated from the user are transmitted to the voice assistant.

16. The method of claim 10, wherein the vibration data includes recorded vibrations from the body surface, wherein the vibrations are resultant from sounds spoken by the user.

17. The method of claim 10, wherein the per-segment analysis includes determining whether each of the one or more data segments corresponds to human speech, based at least upon, for each of the one or more data segments:
determining whether a length of the data segment is at least a predetermined length corresponding to human speech;
determining whether the data segment indicates a glottal pulse sequence of at least the predetermined length;
determining whether a frequency of the glottal pulse sequence is within a predetermined range of frequencies corresponding to a human speech range; and
determining whether an average difference in pitch variations between the corresponding segment of speech signals and the corresponding segment of vibration data exceeds a predetermined value.

* * * * *